Figure 3:
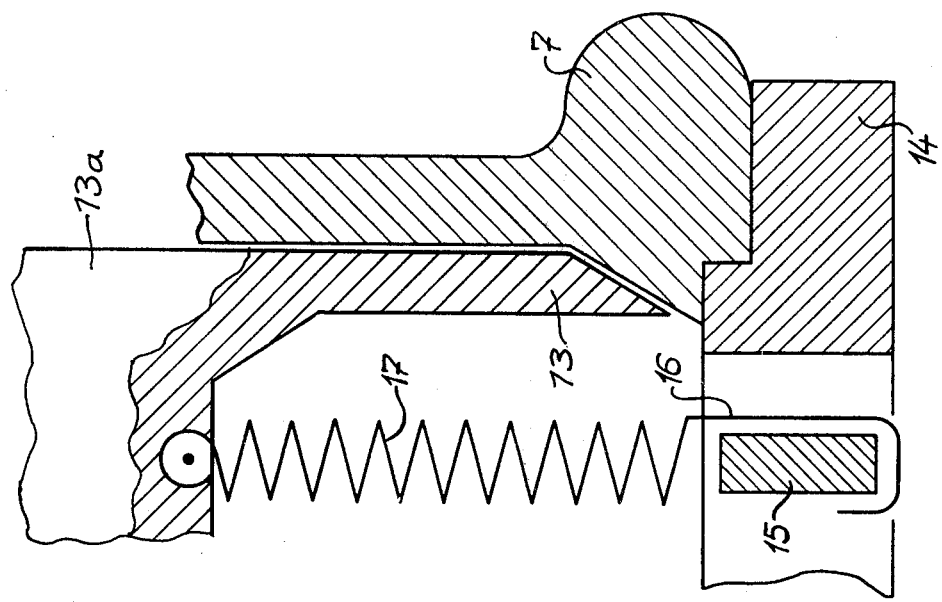

United States Patent [19]

Hardt

[11] 4,000,708
[45] Jan. 4, 1977

[54] APPARATUS FOR CAPPING RECEPTACLES

[75] Inventor: Jean Hardt, Neuhausen am Rheinfall, Switzerland

[73] Assignee: Aluminium Suisse S.A., Switzerland

[22] Filed: Sept. 23, 1974

[21] Appl. No.: 508,283

Related U.S. Application Data

[63] Continuation of Ser. No. 252,896, May 12, 1972, abandoned.

[30] Foreign Application Priority Data

May 17, 1971 Switzerland ............... 7247/71

[52] U.S. Cl. .................. 113/18 R; 29/243.52; 29/509; 29/523
[51] Int. Cl.² .................. B21D 37/00; B21D 51/26
[58] Field of Search ........... 113/18 R; 29/509, 522, 29/523, 243.52; 277/80

[56] References Cited

UNITED STATES PATENTS

| | | |
|---|---|---|
| 1,569,573 | 1/1926 | Piccaluga .................. 113/18 R |
| 1,867,288 | 7/1932 | Thomas .................. 113/18 R |
| 2,558,705 | 6/1951 | Hermann .................. 113/18 R |
| 2,644,415 | 7/1953 | Spalding .................. 113/18 R |
| 3,432,174 | 3/1969 | Teske et al. .................. 277/80 |

*Primary Examiner*—Charlie T. Moon
*Attorney, Agent, or Firm*—Robert E. Burns; Emmanuel J. Lobato; Bruce L. Adams

[57] ABSTRACT

An outwardly flanged valve cup is secured to a rolled annular edge about an opening of an aerosol can, with interposition of a sealing gasket between the flange and edge, by exerting a downward pressure on an inner part of the cap to elastically pre-stress the flange by its reaction pressure against the gasket and edge, and, while the flange is so held, outwardly expanding a skirt portion of the cup by plastic deformation to form an annular fixing bulge therein, the flange being left free to adopt a definitive position as a function of its reaction pressure and being held in its definitive position by the fixing bulge.

10 Claims, 6 Drawing Figures

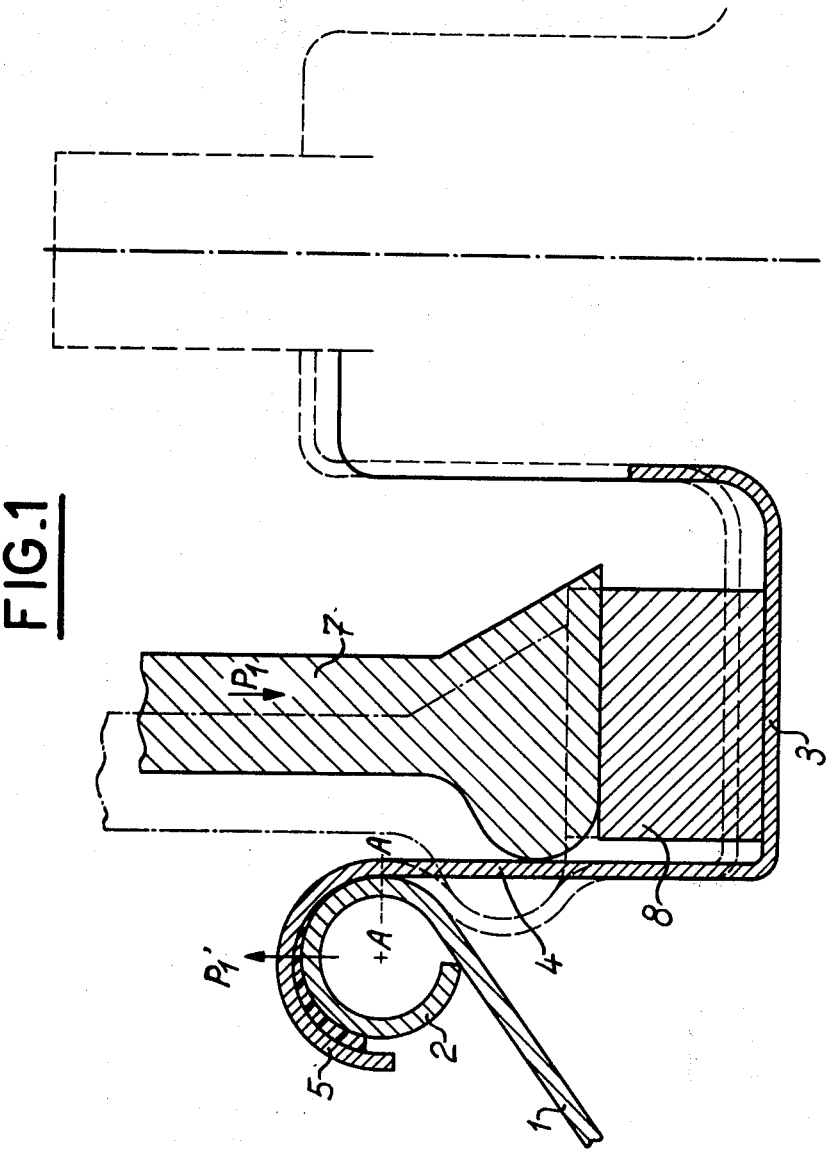

APPARATUS FOR CAPPING RECEPTACLES

This is a continuation of application Ser. No. 252,896, filed May 12, 1972 now abandoned.

The invention relates to the capping of receptacles and is particularly concerned with securing valve-supporting cups to aerosol cans.

Valve cups are generally attached to aerosol cans by diametric expansion of a cylindrical portion or skirt of the cup, inside the neck of the can, by means of a plurality of radially expansible jaws which are spread apart under the action of a mandrel.

The edge of the can is rolled over and engages in a trough-shaped outer flange of the cup, the tightness of the closure being ensured by a gasket compressed between the base of the flange and the rolled edge of the can, the necessary pressure being obtained by expansion of the skirt of the body which bears against the internal, conical wall of the upper portion of the can. This expansion operation is termed "clinching" and is carried out by a so-called clinching machine.

According to the present method of clinching, which has been in use for many years, a tool rigidly connected to the jaws is used to downwardly press the outer flange against the upper edge of the cup with simultaneous expansion of the jaws. An example of such known clinching machines is described in U.S. Pat. No. 2644415.

Although many ways have been tried to perfect this method, by seeking to control all of the factors which effect this operation, a not negligible proportion of the cans are not satisfactorily sealed.

Now, if the mechanical deformations which appear during clinching are examined, the following fact is observed: while the jaws, as they expand, plastically deform the skirt of the cup, the vertical pressure tool bears against and downwardly clastically deforms the flange of the cup, greatly compressing the gasket and the rolled portion of the can, the flange of the cup behaving rather like a girder held at a point close to the clinching groove and undergoing bending. Consequently, when the clinching tool is withdrawn and the force is removed from the flange of the cup, this flange rises again, the point about which bending takes place remaining practically static due to the plastic deformation adjacent to this point. This rising up causes a decrease in pressure on the gasket, without taking into account the deformation which may be produced in the rolled portion of the can and which contributes to a reduction in the pressure on the gasket. Control of this decrease in pressure on the gasket is excessively difficult, so that it may obtain such a value that the seal is no longer guaranteed for the pressures acting inside the aerosol can.

With the known method, the only way of avoiding leaks is to work to closer tolerances with respect to the contact height (height measured between the upper edge of the can and the level of the middle of the curve of the jaws, when the latter are in the work position in the neck of the can, before and after clinching) and to impart to the rolled edge portion of the can an enormous resistance relative to the final pressure which is required to act on the gasket, in order to avoid plastic deformation of the metal of the can, so as to remove at least this cause of reduction of the final pressure on the gasket. Now it will be appreciated that it is practically impossible to observe these conditions in the mass production of certain types of cans.

It is an aim of the invention to provide an alternative process which avoids the above-mentioned drawbacks.

According to a main aspect of the invention, a process for securing an outwardly-flanged cup-section cap onto an annular edge about an opening in a receptacle comprises applying a pressure onto an inner base portion of the cap to hold the flange against a sealing gasket about said edge and, while the flange is so held, outwardly expanding a skirt portion of the cap to form an annular fixing bulge therein.

In this process, the deformations of the cap, gasket and rolled angular edge portion have a favourable effect and are used to profit, instead of having a detrimental effect, as is the case with the previously known method.

The invention will now be particularly described, by way of example, with reference to the accompanying drawings, in which:

FIG. 1 is a schematic view illustrating the general principle of the process according to the invention; and FIGS. 2 to 6 are schematic views of four embodiments of devices for carrying out the process according to the invention.

FIG. 1 shows a conical neck 1 of an aerosol can terminating in a rolled portion 2 forming a rounded annular edge. In this neck 1 is placed a valve cup of elastically and plastically deformable sheet material such as aluminium or an aluminium alloy, the cup including an inwardly projecting base 3, a cylindrical skirt 4, and a rounded outwardly projecting flange 5. The cup is placed with the skirt 4 and base 3 through the opening defined by the edge portion 2, and with the flange 5 fitting over the edge portion 2 with a sealing gasket 6 interposed therebetween. Schematically shown radially-expansible clinching jaws 7 and a block 8, by means of which the jaws 7 may apply pressure to the base 3 of the cup, are inserted in the cup. The valve, which is not shown, is attached in a known manner to the centre of the cup and the assembly (including the jaws 7) is symmetrically disposed relative to the axis of the can.

When the jaws 7 are lowered, they occupy the position shown in full lines. Block 8 exerts a pressure $P_1$ on the base 3 of the cup, under the effect of which gasket 6 is pre-stressed, and ensures the correct positioning of the cup relative to the neck 1 of the can, the thickness of this block 8 being selected so that it forms adjustment means for modification of the grip of the can, gasket and cup assembly.

The pressure $P_1$ on the block and the reaction pressure $P_1'$ on flange 5 produce a couple which tends to elastically lift the edge of flange 5 before clinching is carried out and the tool is withdrawn. This couple thus exerts a favourable pre-stress, as opposed to one which raises the flange at the end of the operation in the presently used method, in which a support part bearing against the flange 5 prevents this movement during the initial phase of the clinching operation.

During the expansion phase of the jaws 7, the latter rise so that the block 8 moves towards the centre of the curvature of the rolled edge portion 2.

Bending is produced in zone A—A of the skirt 4, the traction and compression forces produced in this zone being opposed to the forces due to couple $P_1P_1'$. Traction is, however, also produced, causing elastic deformation of the material.

After release of the jaws 7, couple P₁P₁' disappears, but the stress remains. The elastic deformation produced in zone A—A also remains, due to the gripping action of the annular bulged part of skirt 4 against the lower face of the neck 1 and rolled edge portion 2, as do those of the gasket 6 and the rolled portion 2. There is thus an accumulation of these three deformations, which accumulation determines the force with which gasket 6 is compressed.

The deformations of the elements concerned are thus, in this instance, used to profit, instead of being detrimental as is the case in the method used until now.

In order to emphasise the advantages of the new method, let us now once more compare the two methods.

With the previous method, because of the fixed distance between the support piece (which bears down down against the flange) and the collar of the expansible jaws, the flange is bent downwards, i.e. against the gasket and the rolled edge portion, during clinching. A not negligeable part of the bending is of an elastic nature. When the clinching tool is removed, the flange lifts of its own accord, dependent on the elastic part of the deformation towards the gasket caused by the said support piece. Moreover, the flange lifts until the forces are in equilibrium, as a function on the one hand of its own deformation characteristics and on the other hand of the anulled deformation characteristics of the gasket and the rolled edge portion of the neck. As a result of this double release of the flange, the remaining gasket compression force, on which amongst other things the seal depends, may be of the order of only 20 to 60 Kg, although it may be 150 to 450 Kg on completion of the radial expansion of the clinching jaws.

With the novel method, such a release of the flange is no longer able to occur. In fact, as soon as the block presses on the base of the cup, the flange is bent towards its definitive position. By appropriate choice of the gemoetric conditions, i.e. the dimensions of the neck, thickness of the gasket, thickness of the cup, thickness of the block and sides of the jaws in the expanded state and their respective deformation characteristics, the bending of the flange and consequently the compression of the joint are against accentuated and adopt a definitive state. This means that withdrawal of the clinching tool does not cause release of the flange and thus presents none of the inconveniences inherent in the old method.

Figure 2:
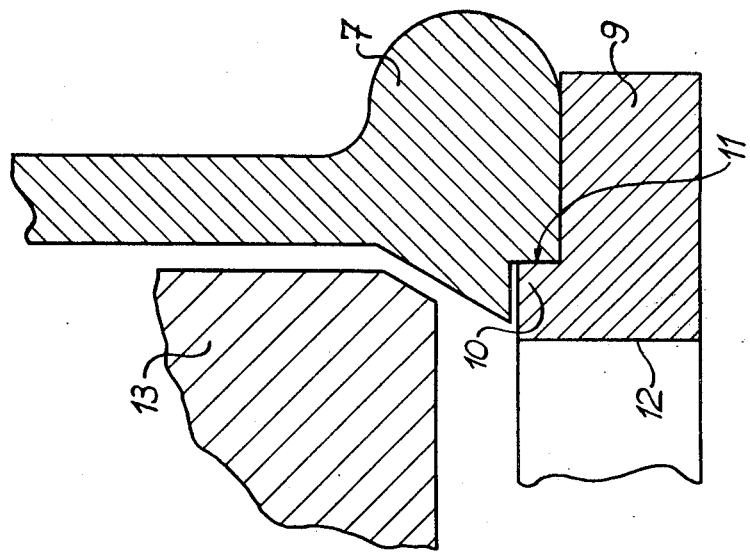

Block 8 would generally be provide in the form of a washer to allow passage of a raised central part of the cup for supporting the valve. This washer may however have greatly varying forms and may be attached to the clinching tool by various means. FIG. 2 represents a first embodiment in which the block is formed by a magnetized metallic washer having a cylindrical shoulder 10 engaging in an annular recess 11 in the jaws 7 to automatically centre the washer 9 relative to jaws 7. As a variation, the central hole 12 in washer 9 could have a smaller diameter than shown, so that a piston sliding along the axis of a mandrel 13, forming means for expanding the jaws 7 by a camming action, could exercise a direct pressure on the washer 9, instead of the jaws exercising this pressure.

In FIG. 3, the block is formed by a washer 14 of non-magnetic material having a diametric bar 15 by means of which the washer 14 is attached to the mandrel of the pincers or a control piston therefor, by means of a spring 17 connected to the mandrel or control piston and connected to the bar 15 by a hook 16.

Figure 4:
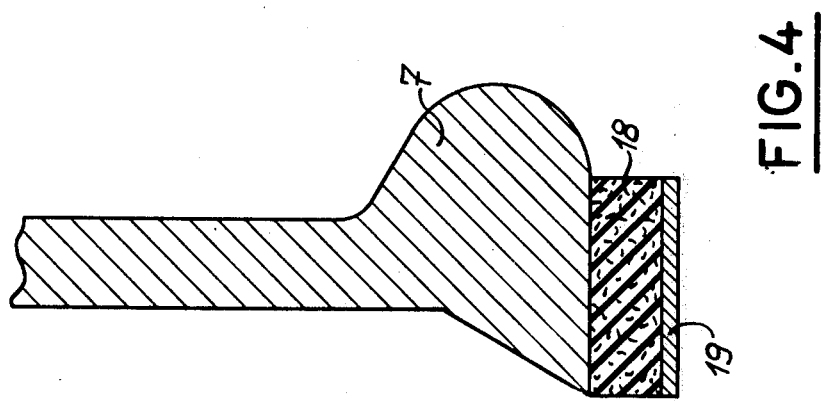

In the embodiment represented in FIG. 4, the block is formed by a rubber washer 18 containing magnetized particles, by means of which the washer is held by magnetic attraction against the end of the jaws 7. The lower surface of the washer is coated with a non-magnetic layer 19 forming a magnetic screen spacing the magnetized part from the metal of the cup.

Figure 5:
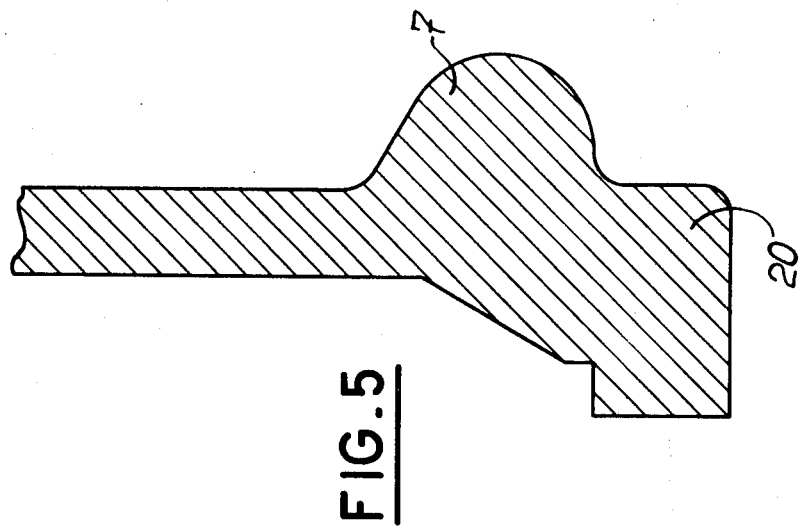

In the embodiment represented in FIG. 5, the block is formed by extensions 20 integral with the jaws 7; the block thus includes as many extensions 20 as there are jaws.

Figure 6:
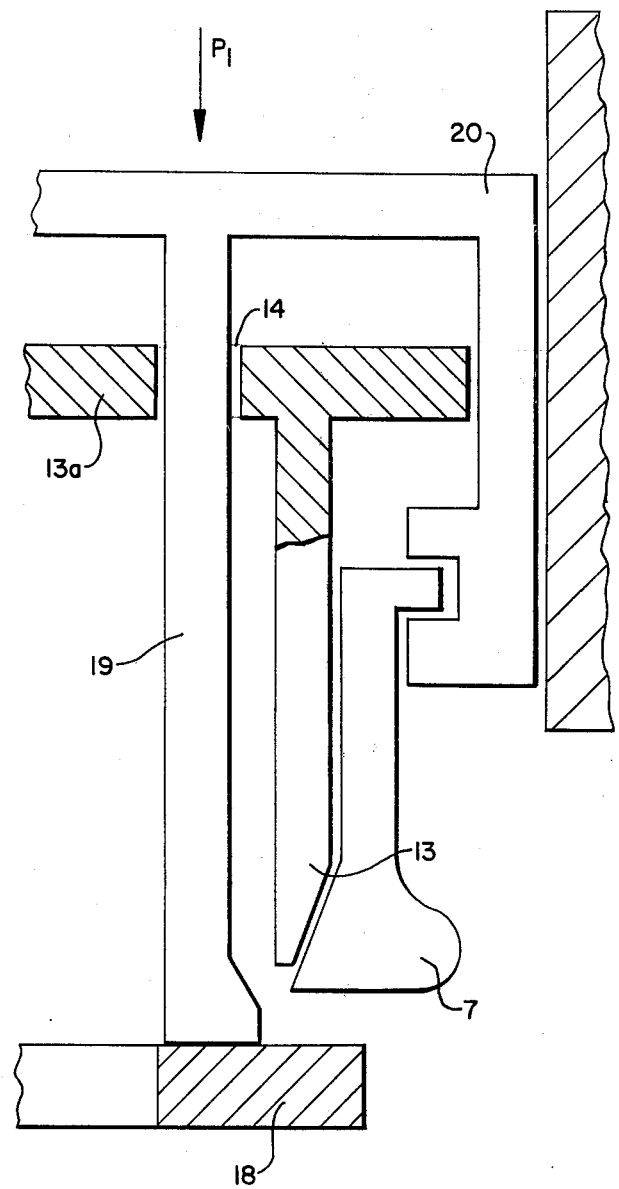

In the embodiment of the invention illustrated in FIG. 6, an axially moveable frame 20 has disposed therein a hollow cylinder or piston 13a having a skirt 13. The skirt 13 is complementary to a surface of the jaws 7, and coacts therewith to radially displace the jaws 7 in response to downward displacement of the piston 13a relative to the jaws 7.

The frame 20 has a shaft or arm 19 extending in a longitudinal direction of the frame 20. The shaft 19 passes through an opening 14 in the crown of piston 13a so that the axial positions of piston 13a and frame 20 may be set independently of one another. Block 18 is carried on an end of the shaft 19 remote from the frame 20.

In operation the frame 20 is lowered so that block 18 applies a pressure P₁ to the bottom of a cap skirt of a cap sealed in a can to prestress the cap skirt. As the frame 20 lowers, the jaws 7 descend into the cap and are positioned opposite a portion of the cap skirt to be clinched. While the cap skirt is stressed, the piston 13a is lowered to expand the jaws 7 to clinch the cap to the can. After clinching, the piston 13a is raised, the jaws recede from the cap skirt and the frame 20 is raised withdrawing the block 18 from the cap.

I claim:
1. A swaging device for securing a cup-shaped metal cap having a skirt, a bottom and an outwardly projecting circumferential flange about a mouth thereof to a receptacle having a conically converging neck at one end and having an opening defined by an edge of said receptacle provided in said neck for receiving said cap, said swaging device comprising:
   a. loading means for axially stressing said skirt when the cup-shaped metal cap is disposed in the mouth of a receptacle with the skirt extending into the receptacle and the flange disposed on the edge defining the receptacle opening thereby developing stresses in the flange to stress the flange in a direction to effect a seal between the mouth of the receptacle and the flange; and
   b. clinching means for circumferentially extending a portion of the cap skirt while the cap skirt is axially stressed to form by plastic deformation a circumferential bulge therein permanently set to secure the cap to the converging neck of the receptacle and permanently maintain the flange in a stressed condition to form a permanent seal between the flange and the mouth of the receptacle, said clinching means comprising a plurality of radially displaceable clinching jaws symmetrically disposed about a common axis, each of said clinching jaws being provided with a bulged portion on an outer surface thereof for forming said circumferential bulge on said cap skirt when said jaws are radially outwardly displaced, said plurality of jaws having an outer diameter in a region opposite said flange of said cup less than an inner diameter of said cup when said clinching jaws are outwardly displaced so that said clinching jaws do not contact said flange or said cup skirt in an area around said flange, and means for radially displacing said clinching jaws outwardly for forming said circumferential bulge and inwardly for releasing said cap skirt from said clinching jaws.

2. A swaging device according to claim 1, wherein said clinching means comprises said loading means.

3. A swaging device according to claim 1, wherein said clinching jaws are disposed about a longitudinal axis, and spaced therefrom defining a cylindrical space therebetween, said jaws having a leading end insertable into said cap skirt and have inner surfaces diverging toward said leading end and converging toward said longitudinal axis, and said means for radially displacing said clinching jaws comprise a piston axially displaceable in said space and having an outer surface complementary with the inner surface of said jaws for radially expanding said jaws when axially displaced toward said leading end.

4. A swaging device according to claim 3, wherein said loading means comprises a spacer, positioned in use on the bottom of said skirt and on which the bottom of said jaws are seated, and a spring connected to said axially displaceable piston for securing said spacer to said clinching jaws.

5. A swaging device according to claim 1, wherein said loading means comprises a spacer, positioned in use on the bottom of said skirt and on which said jaws are seated, comprising means for centering said loading means relative to said clinching jaws.

6. A swaging device according to claim 1, wherein said loading means is a spacer, positioned in use on the bottom of said skirt and on which said jaws are seated, made of magnetic material.

7. A swaging device according to claim 1, wherein said loading means is a spacer, positioned in use on the bottom of said skirt and on which said jaws are seated, made of non-metallic material containing magnetized particles.

8. A swaging device according to claim 3, wherein said loading means comprises a spacer disposed on a frame of a swaging machine a fixed distance from said clinching jaws.

9. A swaging device for securing a cup-shaped metal cap having a skirt, a bottom and an outwardly projecting circumferential flange about a mouth thereof to a receptacle having an opening defined by an edge of the receptacle and dimensioned for receiving therein the cap with the cap skirt extending into the opening and the cap flange disposed on the receptacle edge; said swaging device comprising:
  a. a plurality of radially displaceable clinching jaws symmetrically disposed about a common axis and each having a leading and axially insertable into the cap inwardly of the skirt with said plurality of clinching jaws inwardly displaced for each loading the cap bottom to axially stress the cap skirt and each loading the cap bottom to stress the cap flange disposed on said edge to effect a seal between the cap flange and the receptacle edge, each of said clinching jaws having a bulged portion on an outer surface thereof and adjacent the leading end portion thereof for forming a permanently set circumferential bulge on the cap skirt when said plurality of clinching jaws are radially outwardly displaced within the cap, said plurality of clinching jaws having a transverse dimension along a portion thereof disposed opposite the cap flange less than an internal transverse dimension of the cap flange and skirt when said plurality of jaws are radially outwardly displaced to form the circumferential bulge while loading the cap bottom in order to prevent disturbance of the stressed condition of the cap flange during the formation of the circumferential bulge; and
  b. means for radially outwardly displacing said clinching jaws to outwardly deform the skirt below the level of the receptacle edge to form a permanently set circumferential bulge on the cap skirt below the level of the receptacle edge engaging the receptacle edge, while said plurality of clinching jaws are within the cap skirt and loading the cap bottom and axially stressing the cap skirt and stressing the cap flange thereby to permanently secure the cap to the receptacle edge and permanently maintain the flange in a stressed condition to form a permanent seal between the cap flange and the receptacle edge, and for radially inwardly displacing said plurality of clinching jaws for releasing the permanently secured cap skirt from said plurality of clinching jaws to allow axial withdrawal of said plurality of clinching jaws from said cap.

10. A swaging device for securing a cup-shaped metal cap having a skirt, a bottom and an outwardly projecting circumferential flange about a mouth thereof to a receptacle having an opening defined by an edge of the receptacle and dimensioned for receiving therein the cap with the cap skirt extending into the opening and the cap flange disposed on the receptacle edge; said swaging device comprising:
  a. a plurality of radially displaceable clinching jaws symmetrically disposed about a common axis and each having a leading end axially insertable into the cap inwardly of the skirt with said plurality of clinching jaws inwardly displaced for each bearing on the cap bottom to axially stress the cap skirt and each bearing on the cap bottom to stress the cap flange disposed on said edge to effect a seal between the cap flange and the receptacle edge, each of said clinching jaws having a bulged portion on an outer surface thereof and adjacent the leading end portion thereof for forming a permanently set circumferentially bulge on the cap skirt when said plurality of clinching jaws are radially outwardly displaced within the cap, said plurality of clinching jaws having a transverse dimension along a portion thereof disposed opposite the cap flange less than an internal transverse dimension of the cap flange and skirt when said plurality of jaws are radially outwardly displaced to form the circumferential bulge while bearing on the cap bottom in order to prevent disturbance of the stressed condition of the cap flange during the formation of the circumferential bulge; and
  b. means for radially outwardly displacing said clinching jaws to outwardly deform the skirt below the level of the receptacle edge to form a permanently set circumferential bulge on the cap skirt below the level of the receptacle edge engaging the receptacle edge while said plurality of clinching jaws are within the cap skirt and bearing on the cap bottom and axially stressing the cap skirt and stressing the cap flange thereby to permanently secure the cap to the receptacle edge and permanently maintain the flange in a stressed condition to form permanent seal between the cap flange and the receptacle edge, and for radially inwardly displacing said plurality of clinching jaws for releasing the permanently secured cap skirt from said plurality of clinching jaws to allow axial withdrawal of said plurality of clinching jaws from said cap.

* * * * *